United States Patent [19]

Fortmann et al.

[11] Patent Number: 5,025,132
[45] Date of Patent: Jun. 18, 1991

[54] MICROPROCESSOR CONTROLLED FOOD TREATMENT CABINET WITH FLASH STEAMER AND COMPENSATING HUMIDITY CONTROL ROUTINES

[75] Inventors: Robert C. Fortmann, Mundelein; Curtis C. Pinnow, Libertyville; Gustav Kuschewski, St. Charles; William A. Joseph, Jr., Elburn, all of Ill.

[73] Assignee: Carter-Hoffman Corporation, Mundelein, Ill.

[21] Appl. No.: 524,650

[22] Filed: May 17, 1990

[51] Int. Cl.⁵ ............................................... F27D 7/02
[52] U.S. Cl. ..................................... 219/401; 392/399
[58] Field of Search ............... 219/401, 400, 272, 273, 219/275; 392/399

[56] References Cited

U.S. PATENT DOCUMENTS

| | | | |
|---|---|---|---|
| 2,674,935 | 4/1954 | Lewis et al. | 219/401 |
| 3,077,530 | 2/1963 | Chase et al. | 219/401 |
| 3,744,474 | 7/1973 | Shaw | 126/20 |
| 4,430,557 | 2/1984 | Eichelberger | 219/401 |
| 4,722,268 | 2/1988 | Rightley | 219/401 |
| 4,835,368 | 5/1989 | Fortmann et al. | 219/401 |
| 4,851,644 | 7/1989 | Oslin | 219/401 |
| 4,891,498 | 1/1990 | Fortmann et al. | 219/401 |

Primary Examiner—Teresa J. Walberg
Attorney, Agent, or Firm—Wood, Phillips, Mason, Recktenwald & Vansanten

[57] ABSTRACT

A microprocessor controlled food treatment/holding apparatus has a cabinet which defines a storage space for food to be treated at a predetermined temperature and relative humidity within said storage space, a heater with a surface that can be heated to a temperature which is sufficient to boil water for a predetermined length of time, and a controlled solenoid for delivering a plurality of preselected amounts of water against the heater surface according to the length of time a cabinet door is opened. Detailed operating parameters for the storage space of the temperature and relative humidity conditions are maintained in suitable memory and polled by the microprocessor during operation of the apparatus as real-time data from remote sensors are sent to the microprocessor, which controls the monitoring system of the apparatus. Separate and independent control logic exist for an initial pre-heat mode of operation, as well as for a normal operating mode of the apparatus for the cabinet door being opened and for the cabinet door being unopened for an extended period of time. Also disclosed is a method for controlling the temperature and relative humidity of a storage spaced within a cabinet apparatus used for treating and holding prepared food prior to serving.

37 Claims, 10 Drawing Sheets

MICROPROCESSOR CONTROLLED FOOD TREATMENT CABINET WITH FLASH STEAMER AND COMPENSATING HUMIDITY CONTROL ROUTINES

BACKGROUND OF THE INVENTION

It is a principal object of fast food operators and managers of restaurants to provide their customers with food items that have a fresh-cooked taste. In high volume establishments, cooking on a per order basis is impossible. Instead, food items are generally precooked and placed in a heated food treatment cabinet for extended periods of time. Commercial designers of food treatment cabinets strive to maintain, as long as is practical, the temperature, appearance, taste, texture, and aroma of precooked food items. This goal often competes with the need to eliminate food-born bacteria. If the cooking space in the cabinet is maintained at temperatures in excess of 140° F., most of the food-born bacteria is killed. However, at these elevated temperatures, the foods may be further cooked, which is undesirable as the foods will dry out over time. The result is that fast food operators and managers of restaurants permit only a very limited storage time to store precooked food items, after which time the food items are disposed of. Therefore, in such operations, profits may be increased if it were possible to lengthen the permissible storage time for food within the food treatment cabinet.

One attempt to preserve the just-cooked taste of foods has been disclosed by the Fortmann et al. U.S. Pat. No. 4,835,368, hereby incorporated by reference herein, which discloses a food treatment/holding apparatus which delivers a metered amount of water at preselected intervals against a heated surface to produce water vapor in an interior food storage space. Also, an interval reset switch is disclosed which is operable upon a cabinet door being moved from its closed to its opened position. When the reset switch is operated, a pulse of water is released to replenish the vapor within the interior storage space that may have been lost to the atmosphere upon the cabinet door being opened. With such a food treatment cabinet apparatus, one problem which has been addressed by another Fortmann et al. U.S. Pat. No. 4,891,498, hereby incorporated by reference herein, results from that fact that the amount of humidity which is released to the atmosphere is dependant upon the length of time which the door has been open; thus, sufficient relative humidity may not be replenished within the interior storage space to maintain the desired steaming of the food items stored therein. However, one problem which remains is the fact that only a limited number of discrete time periods can be compensated for owing to the use of relay technology.

Furthermore, it would be an advantage for product reliability purposes, and ease of field service in the event of in-service failure, to have food treatment apparatus to be of a solid-state design and construction. Microprocessor controlled logic within the food treatment apparatus would increase flexibility with respect to future feature changes and reduce field service constraints relating to the number of components required within the food treatment apparatus with respect to implementing the standardization required for large fast food establishments with thousands of multiple locations. Under these circumstances manufacturing learning curves would be applicable over time to effectively reduce the cost of manufacturing microprocessor controlled, solid-state food treatment apparatus.

The present invention is intended to overcome one or more problems set forth in the prior art.

SUMMARY OF THE INVENTION

Accordingly, it is a primary object of the present invention to provide an improved microprocessor controlled food treatment cabinet apparatus for treating and holding food items at a predetermined temperature and relative humidity.

Another object of the present invention is to provide an improved microprocessor controlled food treatment cabinet apparatus having compensating temperature and humidity control routines for treating and holding food items at a predetermined temperature and relative humidity.

It is another object of the present invention to provide an improved microprocessor controlled food treatment cabinet apparatus having compensating temperature and humidity control routines for treating and holding food items at a predetermined temperature and relative humidity that are dependent upon the length of time the cabinet door to the food treatment cabinet apparatus has remained previously open.

Other objects, advantages and features of the present invention will become apparent from a consideration of the following specification taken in conjunction with the accompanying drawings.

Particularly, there is disclosed herein an apparatus for treating and holding food items at a predetermined temperature and relative humidity for a finite period of time, comprising a cabinet defining an interior storage space for food to be treated. The cabinet has an access opening to permit placement of food items in and removal of food items from the interior storage space. The cabinet has a door operatively mounted for selective movement between a closed position, wherein the access opening is covered, and an open position, wherein the access opening is uncovered. The apparatus has means for sensing if the door is in the open position, and means for heating a heater apparatus. The heater apparatus has a heater surface which is located within the cabinet. The heater surface is capable of being selectively heated to a sufficiently high temperature to effectively vaporize water placed on the heater surface in the storage space. The apparatus has means for delivering water against the heater surface in a controlled method to provide water vapor in the storage space. A microprocessor control means is coupled to the sensing means and to the means for delivering water for causing the means for delivering water to deliver a preselected metered volume of water to the heater surface according to the amount of time that the door has been in the open position to compensate for the loss of the humidity from the storage space to the atmosphere upon the door being opened. A memory associated with the microprocessor control means contains predetermined parameters relating to time and humidity characteristics within the storage space. The memory provides the parameters to the microprocessor control means upon selective querying by the microprocessor control means. The microprocessor control means is responsive to the output of the memory. A display integral to the food treatment apparatus and responsive to the microprocessor control means is present in one embodiment of the present invention.

A method is provided for controlling the temperature and relative humidity of a storage space within a cabinet apparatus used for treating and holding prepared food, comprising the steps of initializing power to the apparatus, performing a preheat cycle for a definite time interval to raise the temperature of the storage space to a predetermined temperature parameters, performing a prehumidity cycle for a definite time interval to refresh the relative humidity of the storage space to a predetermined relative humidity parameter, monitoring the status of the door to the cabinet apparatus with respect to an open and a closed position and when in the open position then monitoring with respect to the length of time the door to the cabinet has remained in the open status, performing a normal operating cycle to adjust the temperature and relative humidity of the storage space to predetermined levels depending on the length of time the door to the cabinet has been in an open status, the normal operating cycle further comprising the steps of sensing if the door is in the open position, heating a heater apparatus to a predetermined temperature level, delivering water against a portion of the heater apparatus in a controlled manner, and converting the sensing means to digital output signals, displaying the results of the above steps, upon inquiry, in a visual display which is integral to said cabinet apparatus, and controlling the normal operating cycle, the preheat cycle and the prehumidity cycle with respect to cycle duration when the relative humidity and the temperature of the storage space of the cabinet apparatus exceed specified predetermined parameters through the operation of a general purpose microprocessor.

DETAILED DESCRIPTION OF THE DRAWINGS

This invention relates to a food treatment cabinet with a flash steamer and humidity control and, more particularly, to a food treatment cabinet defining an interior space whereby the temperature and relative humidity of the interior space are automatically controlled by a microprocessor based controller.

Figure 1:
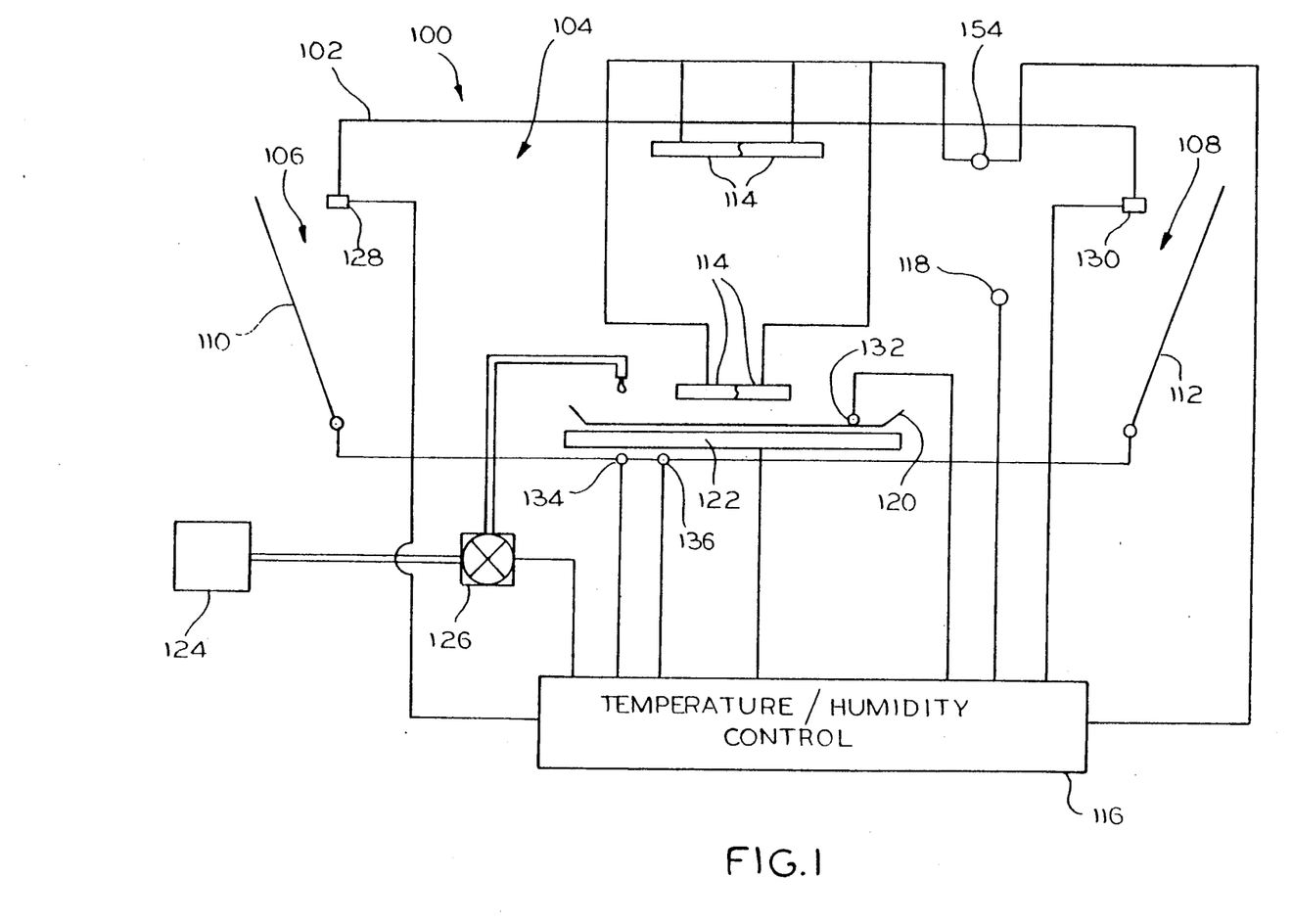
FIG. 1 is a combined diagrammatic schematic block diagram of the system for the food treatment/flash steamer apparatus according to the present invention.

FIG. 1 is a combined diagrammatic schematic block diagram of the system for the microprocessor controlled flash steamer apparatus incorporating the compensating humidity control of the present invention. Referring now to FIG. 1, a food treatment holding apparatus 100 according to the present invention consists of a generally rectangular shaped cabinet 102, defining an interior space 104 for the storage of food to be treated. The cabinet 102 includes opposite front and rear rectangular access openings 106 and 108, respectively, through which access to the interior space 104 is achieved. Doors 110 and 112 are matched to the configuration of the respective access openings 106 and 108, and are operatively hinged to the cabinet 102 for relative pivoting movement between an open position and a closed position.

The microprocessor controlled food treatment apparatus of the present invention may be provided with different cabinet structures, as is obvious to those skilled in the art.

The interior space 104 is heated by four conventional heater elements 114 supported within the cabinet 102 by any conventional means. The heat developed by the heating elements 114 can be selectively controlled by certain dedicated temperature control logic in a general microprocessor based control 116. An analog temperature probe 118 senses the temperature of the interior space 104 and feeds a signal to the control 116 so that the preselected temperature is maintained within the interior space 104.

Within the interior space 104, relative humidity is developed utilizing a secondary reservoir 120 located in the bottom of the cabinet 102. A conventional water heater 122 is affixed to the cabinet 102 by any conventional means and is in a heat exchange relationship with the secondary reservoir 120. The heater 122, which is illustrated in FIG. 1, is only exemplary of one of any number of heaters which can be used. For example, a silicon pad heater or tubular heater element, as used in conventional ovens, can be substituted for the water heater 122 illustrated in FIG. 1. The type of heater chosen must have a capacity to heat the secondary reservoir 120 in a manner which will be sufficient to the boiling temperature of water. Once the secondary reservoir 120 has been suitably heated, water from a primary reservoir, represented schematically at 124, is controllably delivered through a suitable solenoid valve 126, in drop-size particles, and is allowed to be dropped against the secondary reservoir 120, which has been previously heated, and is immediately converted to steam. The steam will diffuse throughout the interior space 104. The primary reservoir 124 is suitably and operatively secured to the cabinet 102. Water is supplied to the primary reservoir 124 from any conventional, pressurized supply (not shown).

According to the present invention, the water is released for delivery against the secondary reservoir 120 in drop-size particles through the operation of certain dedicated humidity control logic in the general purpose microprocessor control 116. The humidity control logic will also control the energization of the water heater 122.

A pair of remote door sensors, such as limit switches 128 and 130, are operatively coupled to the control 116 to provide a signal which represents that the cabinet door is open or closed. Should the temperature of the secondary reservoir 144 be below the boiling temperature of water, then the incoming water will flood the secondary reservoir. This will increase the time it will take to elevate the temperature of the secondary reservoir 120 to the boiling point of water and will also eliminate any possible control that the user will have over the humidity contained within the interior space 104 of the cabinet 102. This is because the humidity is continuously being developed in the secondary reservoir 120 until the majority of the water evaporates upon boiling. If the surface of the secondary reservoir 120 is above a predetermined temperature, then the water being dropped upon the secondary reservoir 120 will tend to splatter. This is undesirable in that the water will not be thoroughly vaporized instantly. To prevent either of these conditions from occurring, first and second thermostats 134 and 136 are operatively coupled to the control 116.

Figure 2:
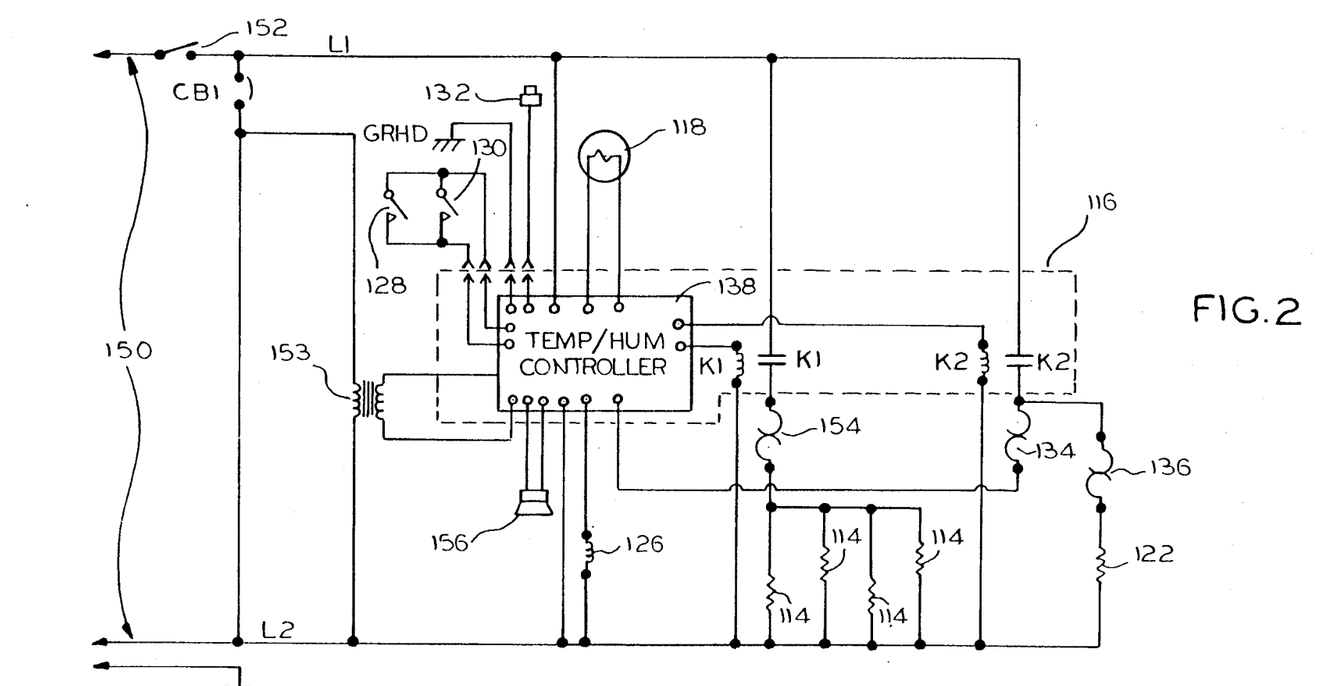
FIG. 2 is a detailed schematic drawing of the apparatus of FIG. 1.

With reference also to FIG. 2 the control 116 includes a dedicated microprocessor based temperature/humidity controller 138. The controller 138 is illustrated in block diagram form in FIG. 2A and has a Microprocessor or central processing unit (CPU) 140 connected to dedicated memory means in the form of a read only memory (ROM) 142 and a random access memory (RAM) 144. The ROM 142 contains a program for operating the CPU 140 and predetermined binary parameters relating to time and humidity characteristics for the storage space 104. The RAM is used for temporary storage. A dedicated visual display 146, see FIG. 6, which is integral to the cabinet apparatus 102, displays the current temperature and humidity readings, as well as the current status of the cabinet apparatus, upon inquiry by a user. An input/output port 148 which includes suitable analog-to-digital converter circuits, connects the CPU 140 to the various input and output elements discussed below.

The controller 138 is powered by a conventional 120 Volt AC power source through a plug 150 and switch 152 between power rails L1 and L2 and also receives low voltage power through a transformer 153. A temperature control relay K1 has its coil driven by the controller 138 and a normally open contact connected between the rails L1 and L2 in series with a thermostat 154 and a parallel connection of the four cabinet heaters 114. Energization of the relay K1 causes the normally open contact to close and thus turn on the cabinet heaters 114. The thermostat 154 is operable to open under high temperature conditions to prevent operation of the cabinet heaters 114.

A humidity control relay K2 has its coil driven by the controller 138 and a normally open contact connected between the rails L1 and L2 in series with the thermostat 136 and the reservoir heater 122. The low temperature thermostat 134 is connected between the controller 138 and the junction between the contact K2 and the thermostat 136 Energization of the relay K2 causes the normally open contact to close and thus turn on the flash heater 122. The thermostat 136 is operable to open under high temperature conditions to prevent operation of the flash heater 122. Also connected to the controller 138 are the door switches 128 and 130, the temperature sensor 118, the solenoid 126 and a reservoir water sensor 132. A speaker 156 is provided for delivering audio alarms indications to a user, as discussed below.

Figure 2A:
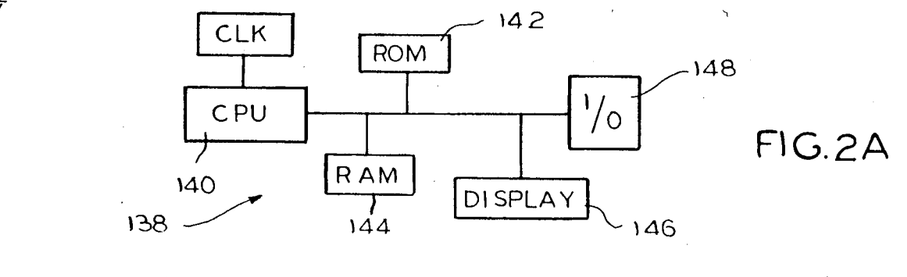
FIG. 2A is a block diagram of the temperature/humidity controller of FIG. 2.

FIGS. 3A-D comprise a flow chart illustrating the specific sequence of operations performed by the general purpose microprocessor of FIG. 2A for the apparatus of the present invention contained in FIG. 1. In the illustrated embodiment, the microprocessor 140 performs the aforementioned humidity and temperature tests in software, such that the flow chart represents the program. However, if different humidity and temperature tests were intended for a different application, then the flow chart would be modified accordingly.

Figure 3A:
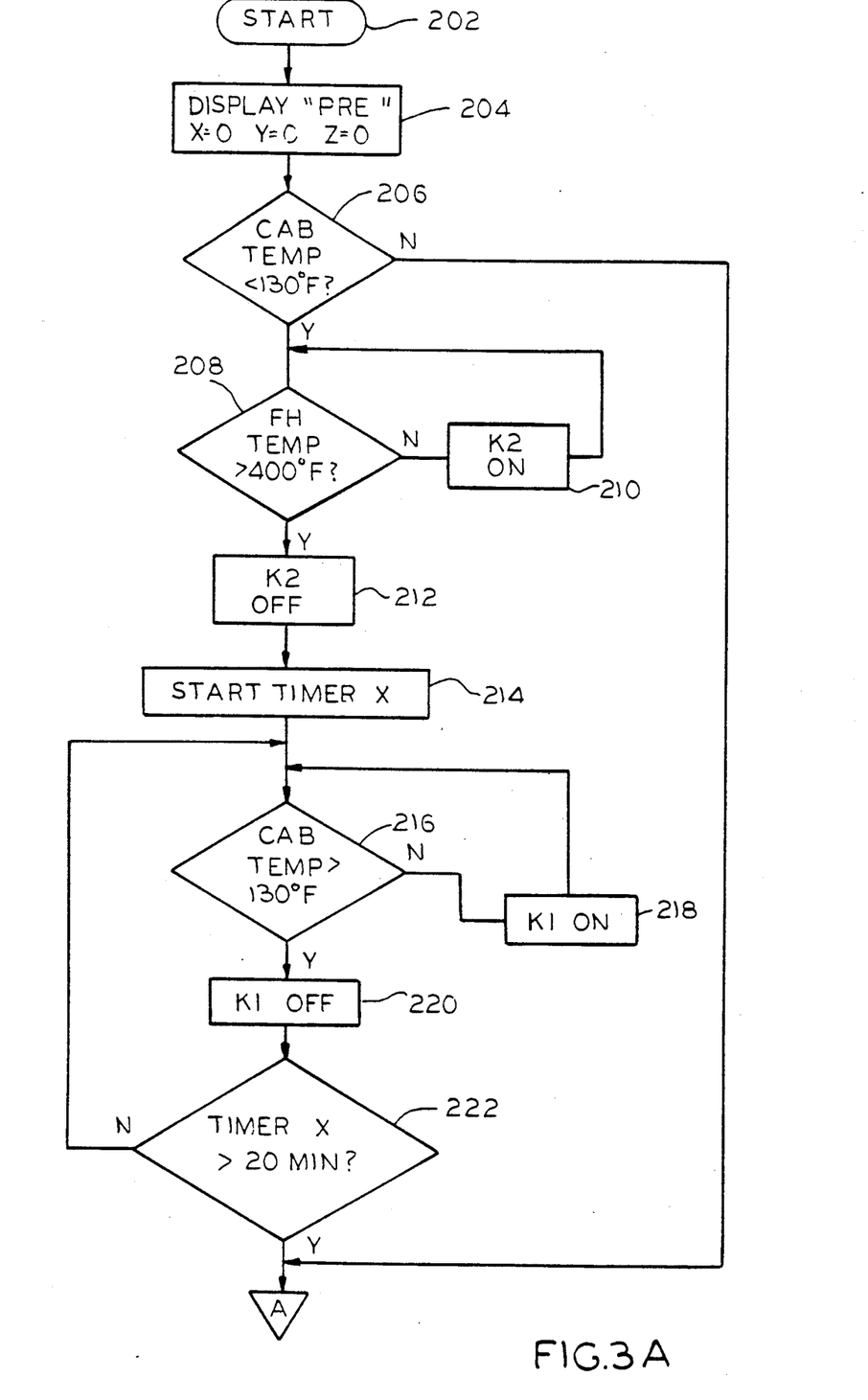
FIGS. 3A-D comprise a flow chart illustrating the specific sequence of operations performed by the general purpose microprocessor of FIG. 2A for the apparatus of the present invention.

The controller 138 initially operates in a preheat mode which elevates the cabinet temperature and humidity to a preselected desired level.

Beginning with a start block 202, which signifies turning power onto the controller 138, the controller 138 initializes the variables X, Y and Z to zero and cycles into the preheat mode of operation, and indicates the status "PrE" in the visual display 146 at a block 204.

At decision block 206, the temperature of the cabinet is tested. If the sensed cabinet temperature, as determined by the sensor 118, is less than 130° F., and AC power is applied, a preheat cycle of twenty minutes is initiated. A decision block 208 determines if the flash heater temperature is above 400° F., i.e., when 120 vac is present at the flash heat low temperature sense input with respect to L2, as determined by the condition of the thermostat 134. If not then the flash heat relay K2 is energized at a block 210 to increase the sensed temperature to the set point temperature. Once the flash heater temperature reaches 400° F., the flash heater relay K2 is deenergized at a block 212 and power is removed from the flash heater 122. At block 214, a twenty minute timing cycle is energized as part of the overall initial preheat cycle by starting a timer. The cabinet temperature is sensed at block 216 to determine if the temperature is greater than 130° F., while the cabinet heaters are energized. If the temperature of the cabinet is less than 130° F., then the cabinet heater relay K1 is energized at a block 218. If the temperature of the cabinet sensed is greater than 130° F., then the cabinet heater relay K1 is deenergized at a block 220. At a decision block 222, the dedicated preheat cycle timer is tested for elapsed time relative to the twenty minute completion cycle. Control loops back to the decision block 216 until the twenty minute cycle is completed, at which time control advances via a node A to FIG. 3B.

Figure 3B:
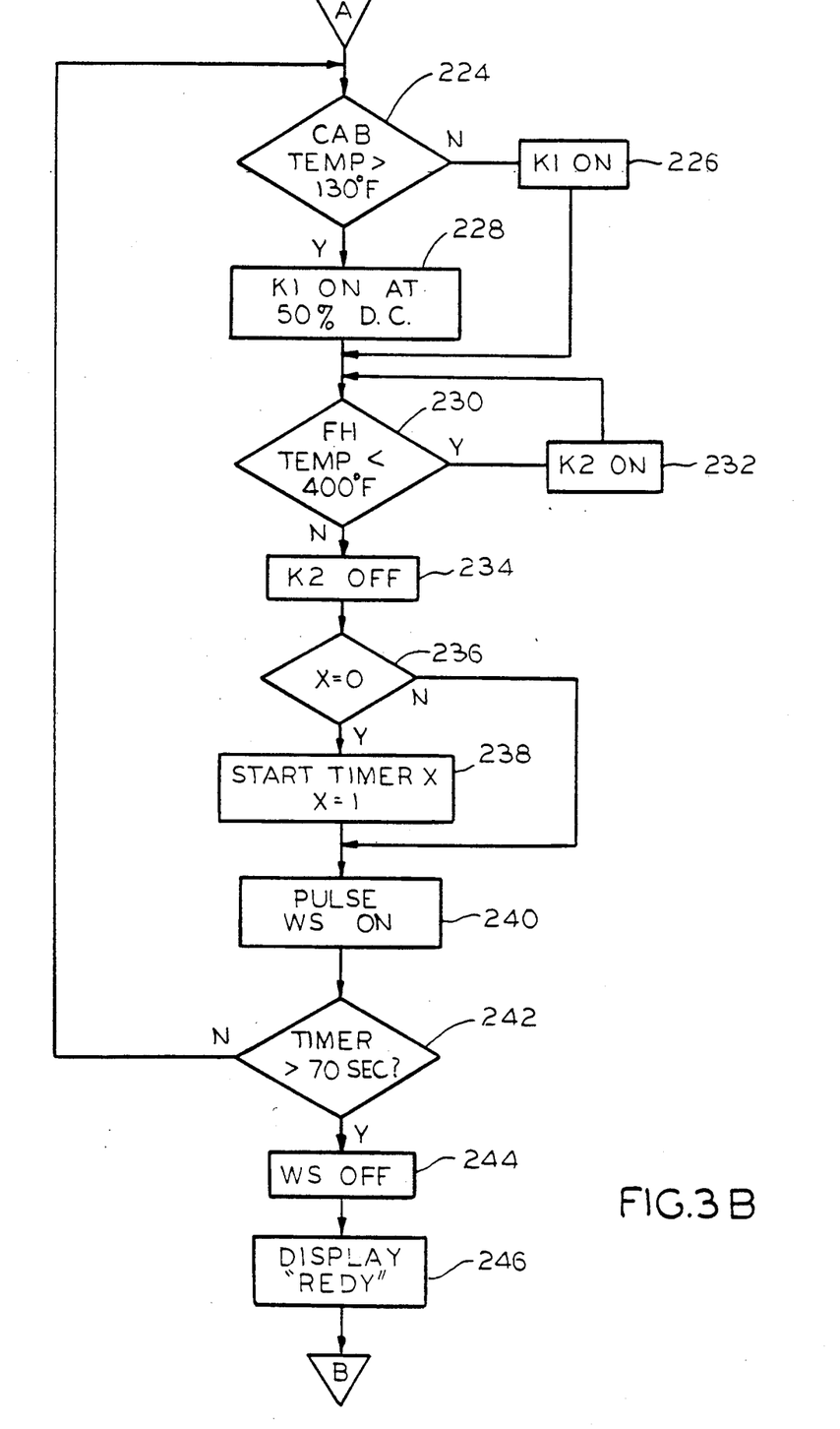

At a decision block 224 the temperature of the cabinet is again tested to determine if the sensed temperature is greater than 130° F. If the cabinet temperature set point of 130° F. or greater is reached the cabinet heater relay K1 is energized utilizing a fifty percent duty cycle at a block 228. If the temperature of the cabinet is less than 130° F., then the relay K1 is energized on a one hundred percent duty cycle at a block 226. In either case, at a decision block 230, the flash heater temperature is tested to determine whether the temperature has reached the set point of 400° F., as discussed above. If the flash heater temperature is less than 400° F., then the flash heater relay K2 is turned on at a block 232 and remains on until 120 vac is present at the flash heater low temperature sense input with respect to L2. If the flash heater temperature is not less than 400° F., then the flash heater relay K2 is turned off at a block 234. An initial humidity cycle lasting 70 seconds then begins. A decision block 236 determines if the variable X is zero, indicating the first pass through this routine. If so then a timer X is started and the variable X is set to one at a Block 238. Since humidity is generated in the cabinet by pulsing the water solenoid 126, the solenoid 126 is pulsed on periodically at a preselected rate beginning at a block 240, which causes water to drop onto the reservoir 120 that has been sufficiently heated by the flash heater 122 to result in vaporization of the water. At a decision block 242, the initial humidity cycle of 70 seconds is tested with respect to duration and once the initial humidity cycle has operated for 70 seconds, then the water solenoid 126 is turned off at a block 244 to end the initial humidity cycle. After the initial humidity cycle is completed, the message "REDY" will be shown on the visual display 146 at a block 246. Thereafter the system will commence temperature regulation predicated on sensed temperature versus set point temperature and relative humidity regulation predicated on relative humidity set point, in conjunction with sensed temperature, and the sequential monitoring of the status of whether the cabinet doors 110 and 112 are open (and if so, for how long) or whether the cabinet doors are presently closed.

The normal operating mode consists of two basic routines: (1) Long Closing routine and (2) Door Open routine. In both of these routines, the cabinet temperature is controlled predicated on sensed temperature versus set point temperature, with the cycling of the cabinet heater relay K1 with a fifty percent duty cycle for a seven second period if the sensed temperature is greater than 130° F. and a one hundred percent duty cycle for a seven second period if the sensed temperature is less than 130° F. During the normal operation cycle, the systems monitors two additional variables, namely: (1) the relative humidity setpoint of the interior space and (2) the length of time that the cabinet door has remained opened since last being closed.

The relative humidity of the interior cabinet is maintained by the "Long Closing" routine when the Door Open sensor determines that inputs are in an open circuit condition, i.e., both doors 110 and 112 are closed, and the water solenoid is not being cycled as result of a recent open door condition. The water solenoid cycle time, in the "Long Closing" routine, is a function of the sensed temperature and the relative humidity set point. The water solenoid cycle time in the "Long Closing" routine is operated concurrently with the flash heat cycle time, but with different durations. The flash heat on time is proportional to the relative humidity setpoint, with the maximum on time during a long closing cycle being eight seconds and the minimum being one half second, as determined by the formula: $FON = INT\{(2*LCp/13)+1\}*0.5$, where FON is the total flash heater on time in seconds, INT extracts the integer component of the expression in parentheses and LCp is the "Long Closing Period" in elapsed seconds. During the flash heater on time, the water solenoid 126 pulses for a duration selected by the relative humidity calibration routine 0.5 seconds after the flash heater relay K2 is energized. If 120 Vac is not present at flash heat low temperature Sense input with respect to L2 within 0.5 seconds of energizing the flash heater relay K2, the water solenoid cycle will be inhibited and the relay K2 remains energized.

Figure 6:
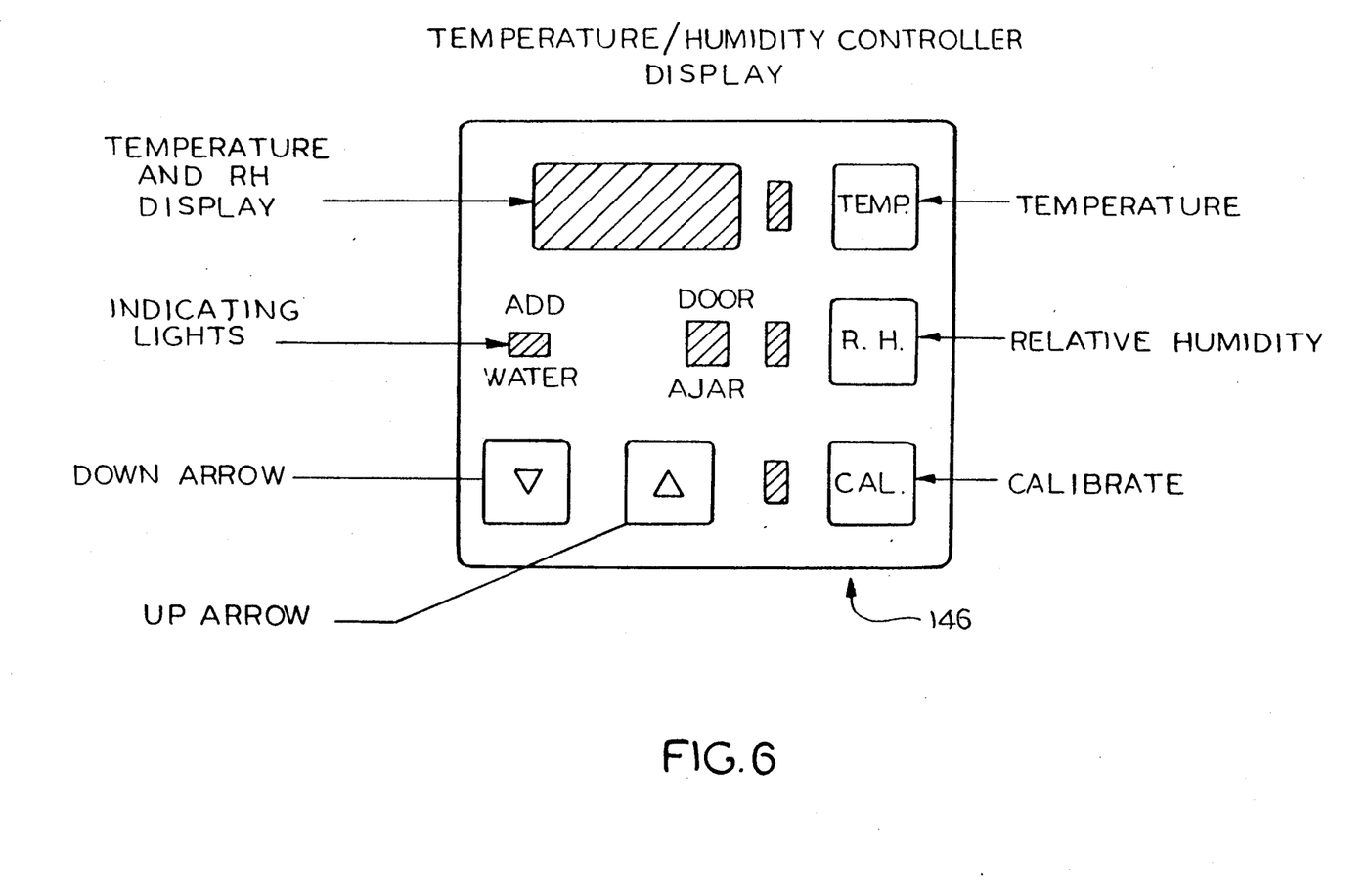
FIG. 6 is an elevation view of the exemplary embodiment of the visual display of the present invention.

When the door switches are closed, a Door Ajar indicator is illuminated, see FIG. 6, and the flash heater relay K2 is energized. The water solenoid 126 is pulsed closed provided there is 120 Vac present at the flash heat low temperature sense input for a predetermined on time every 4 seconds. After the door switches 128 and 130 have been restored to an open circuit, the water solenoid 126 continues to pulse for a duration based on the total time the door was opened, the sensed temperature and the relative humidity set point.

For status indication on the display 246, see FIG. 6, if the sensed temperature exceeds 210° F., the message "HIGH" alternating with the sensed temperature is displayed along with an audible alarm with a 50 percent duty cycle for a 0.5 second period.

A low water condition is present when there is an open circuit between the water probe input as determined by the sensor 132; this condition is enunciated by the "ADD WATER" indicator LED, see FIG. 6, and an audible alarm both pulsing with a 50 percent duty cycle for a 2 second period.

When one of the doors 110 or 112 is open, the Door Ajar indicator is illuminated. If the inputs are restored to an open circuit condition within 20 seconds, the Door Ajar LED will extinguish. If the door remains open for 20 seconds or greater, the Door Ajar indicator will begin to flash and an audible alarm sound with a 50 percent duty cycle for a one second duration. After the doors have been restored to a closed condition, the alarm will continue to sound for an additional 2 seconds before stopping.

When the sensed temperature is less than the set point temperature, the Temperature LED will be illuminated to indicate the Cabinet Heater electronic switch is being cycled.

The Relative Humidity LED is illuminated during the flash heater and water solenoid cycle times.

In order to maintain the cabinet humidity at various Relative Humidity Setpoints and cabinet temperatures, the size of the drop of water which is deposited on the flash heater needs to be of a specific nominal volume, this nominal volume is approximately 0.385 milliliters.

Figure 3C:
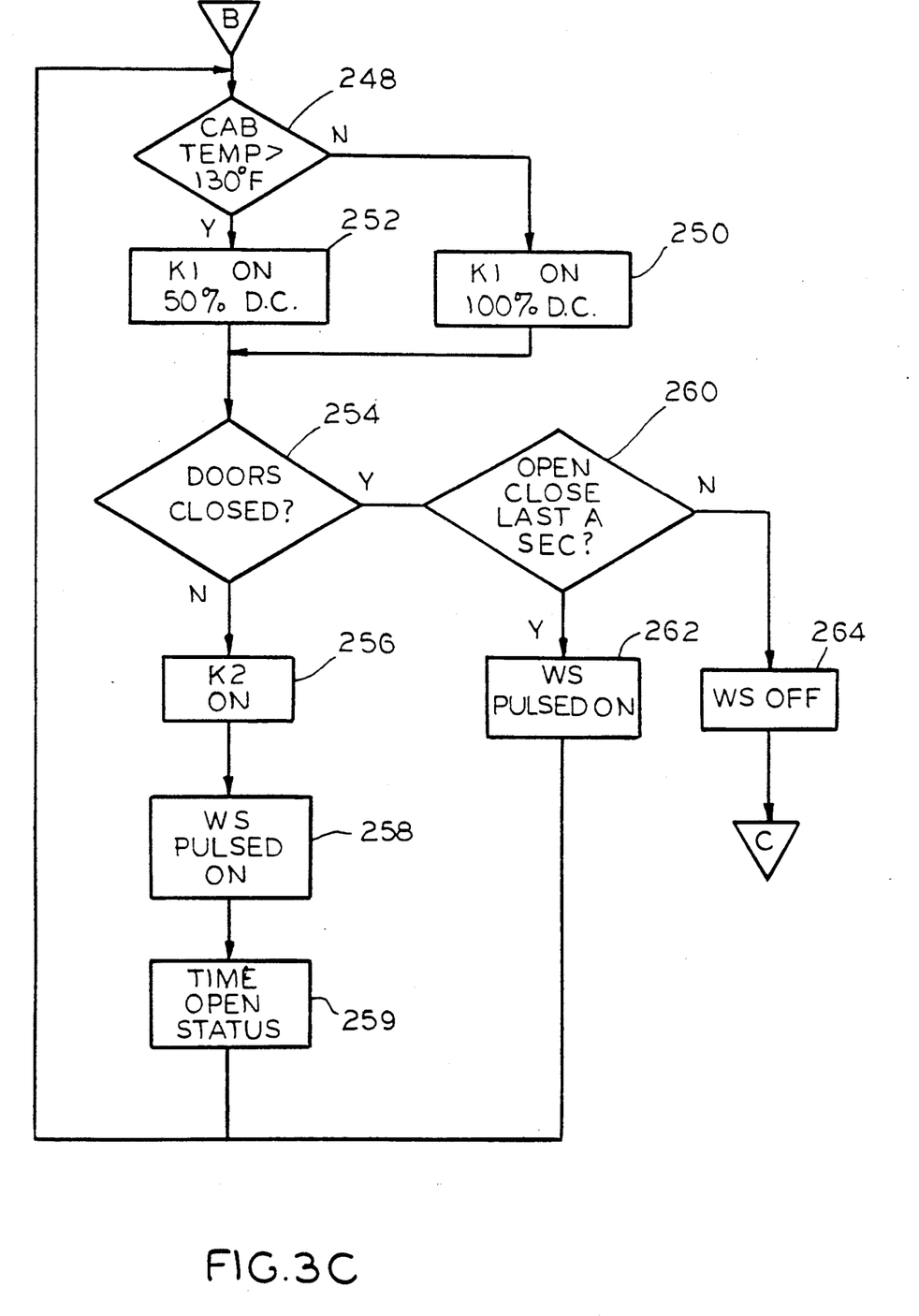

During the normal operating mode, a dedicated Door Open routine, shown in FIG. 3C, monitors the status of the cabinet door switches 128 and 130. At block 248, it is determined whether the sensed temperature of the cabinet 102 is greater than 130° F. If the cabinet temperature is at at least 130° F., then the cabinet heater relay K1 is activated for a fifty percent duty cycle at a block 252. Should the temperature of the cabinet be less than 130° F., then the relay K1 is activated for a one hundred percent duty cycle at a block 250.

At a block 254, the cabinet door switches 128 and 130 are sensed to determine whether both doors 110 and 112 are closed. If either cabinet door is presently ajar, as determined at the block 254, then the flash heater relay K2 is turned on at a block 256 to energize the flash heater 122 and then the water solenoid 126 is pulsed on at a block 258 to replenish humidity being lost to the outside. The total elapsed door open time is then updated at a block 259 and then control loops back to the block 248. If both doors are closed, at block 254, then it is determined at a decision block 260 whether either cabinet door has gone from opened to closed within the last A seconds. The time A represents the water solenoid on time necessary to fully replenish humidity in the cabinet space 104. This variable is determined, as described below relative to FIGS. 5A-5E, as a function of the door open time determined at the block 259. If so, then the water solenoid 126 is pulsed on at a block 262 to continue replenishment using residual heat developed by the heater 122.

Figure 3D:
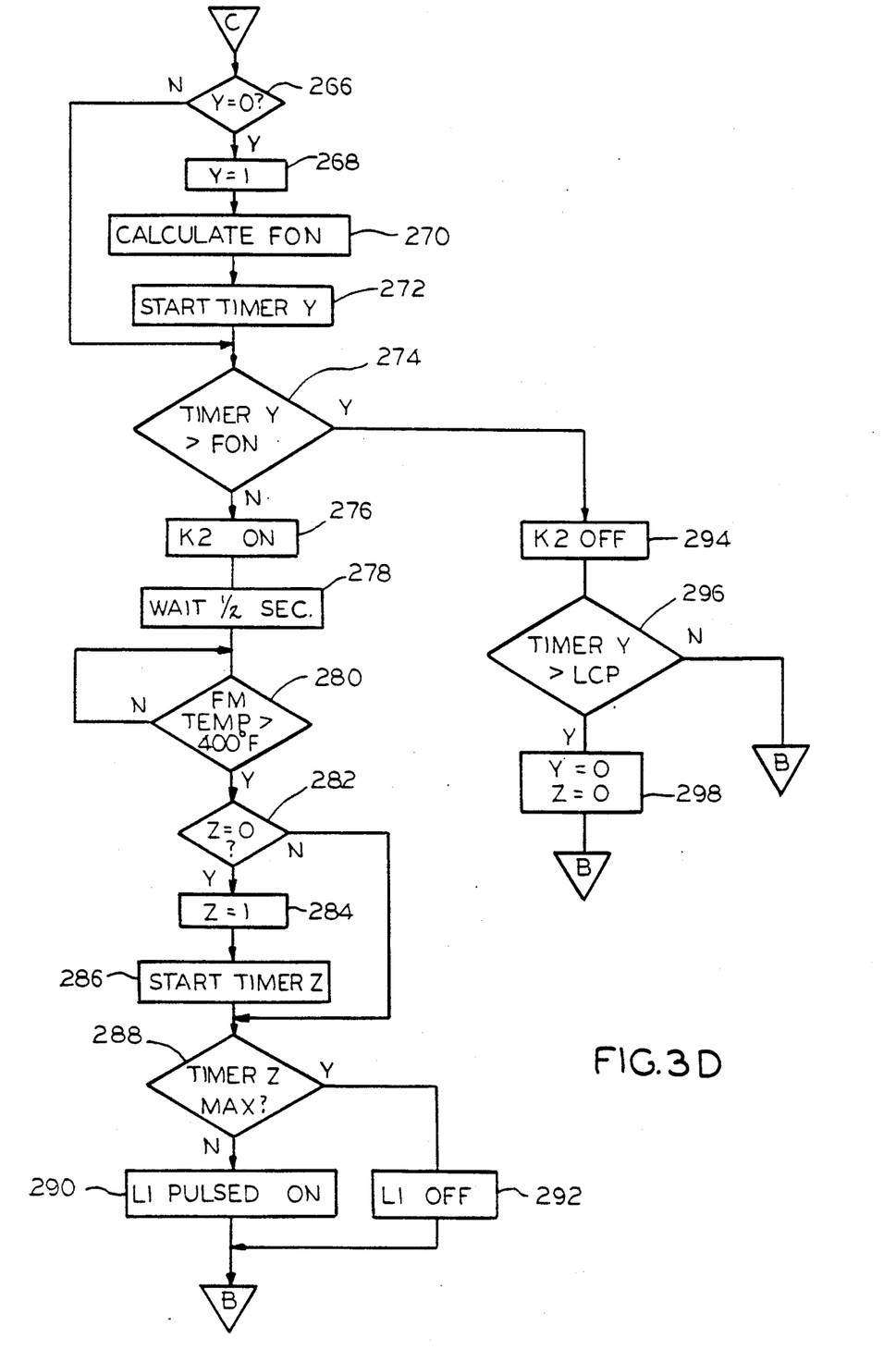

In the event that the cabinet doors are presently closed and have been closed for the last A seconds, as determined at the blocks 254 and 260, then the water solenoid 126 is deenergized at a block 264 and control advances via a node C to the long closing routine shown in FIG. 3D.

During the normal operating mode, the long closing routine monitors the length of time the cabinet door is closed for long durations At a block 266, a variable Y is tested as to whether current status zero or not, indicating the start of the routine. If the current status of the variable has been initialized to zero, in block 268 the variable is established at one. After incrementing the variable to one, in block 270 the flash heat on time FON, discussed above, is calculated. At block 272, a timer Y is initiated. At block 266, if the variable had not been equal to zero, or from the block 276 a decision block 274 determines whether the value of timer Y is greater than the FON determination (e.g. total "ON TIME" of the flash heater). If the timer value is less than the FON value, the flash heater relay K2 is energized to maintain the flash heater 122 in the on status at a block 276. After a wait of one half second at a block 278 to allow the flash heater 122 to preheat, a decision block 280 waits until the flash heater reaches its setpoint of 400° F. At a block 282, the variable Z is tested as to whether current status zero or not, indicating the start of the subroutine. If the current status of the variable has been initialized to zero, in block 284 the variable is established at one. After incrementing the variable to one, at block 286, a timer Z is initiated. The timer Z is used to determine if the maximum water on time has been exceeded The maximum water on time is a user selected value between one half and eight seconds which can be set during a calibration routine. At block 282, if the variable had not been equal to zero, or from the block 286, a decision block 288 determines whether the value of timer Z is greater than the maximum preselected water on time. If not, then the water solenoid 126 is pulsed on at a block 290. If so, then the water solenoid 126 is deenergized at a block 292. From either block 290 or 292 control returns to the node B, see FIG. 3C.

If at the block 274 the timer Y value is greater than the value FON, then control advances to a block 294 at which the flash heat relay K2 is deenergized to turn the flash heater 122 off. Thereafter, a decision block 296 determines if the value of the timer Y is greater than the long closing period total time. If not, then control returns to the node B, see FIG. 3C, to continue the routine. Otherwise the variables Y and Z are reset to zero at a block 298 and control returns to the node B, see FIG. 3C to commence a new long closing routine, assuming the doors 110 and 112 are not opened in the interim.

Figure 4:
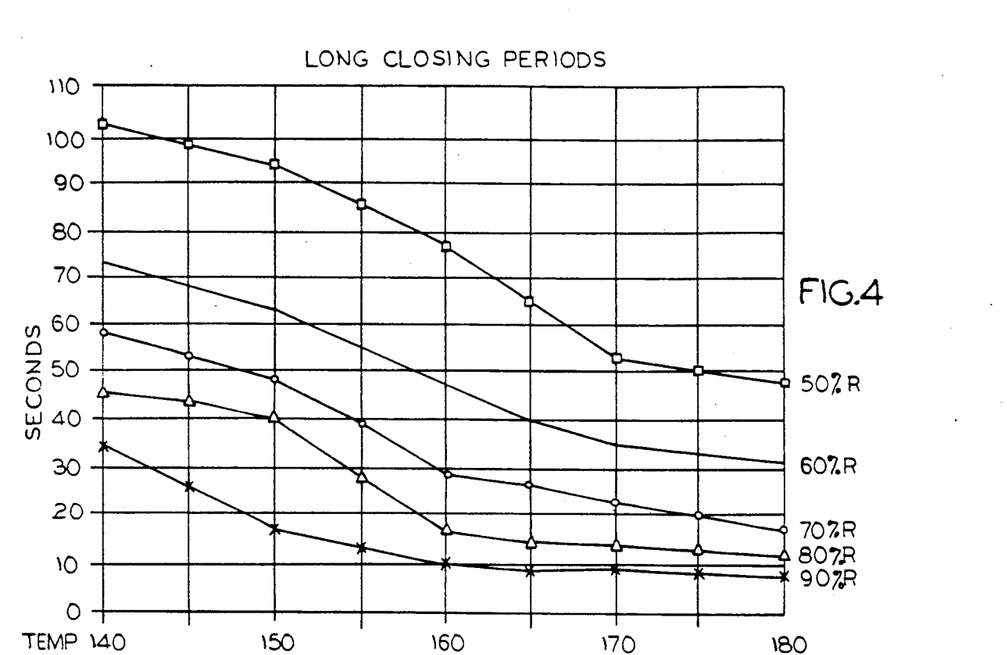
FIG. 4 is a graph of the information stored in memory, comprising various operating curves pertaining to "Long Closing Periods" of the flash steamer apparatus incorporating the compensating humidity control routine of the present invention at various relative humidity levels.
Figure 5A:
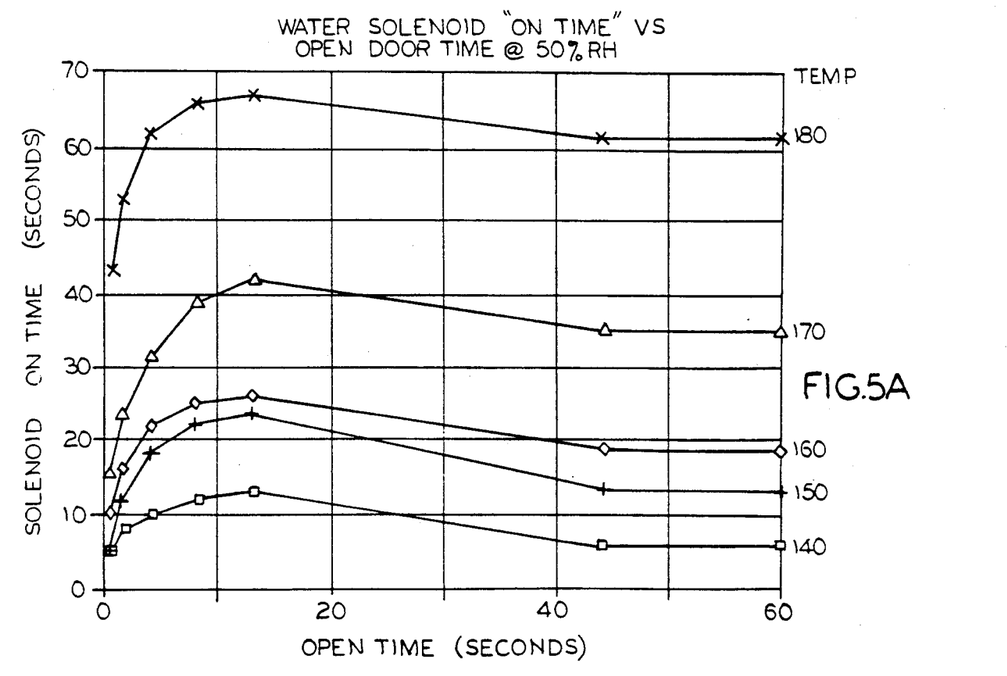
FIGS. 5A-5E are graphs of the information stored in memory, comprising various operating curves pertaining to maintaining desired relative humidity in the flash steamer/food treatment apparatus incorporating the compensating humidity control routine of the present invention.
Figure 5B:
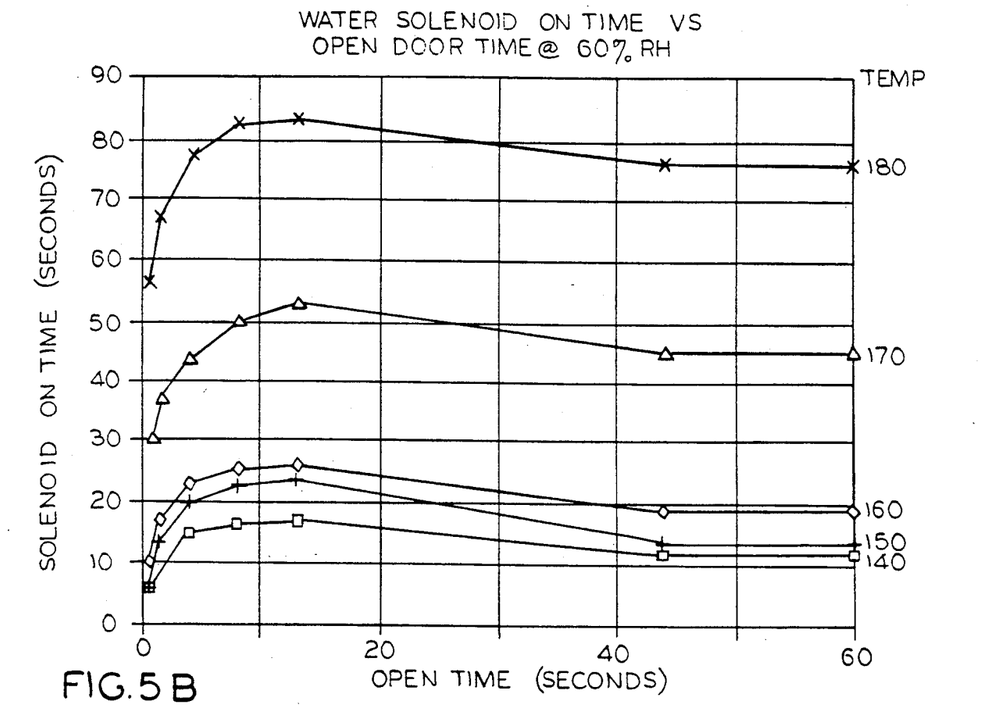
Figure 5C:
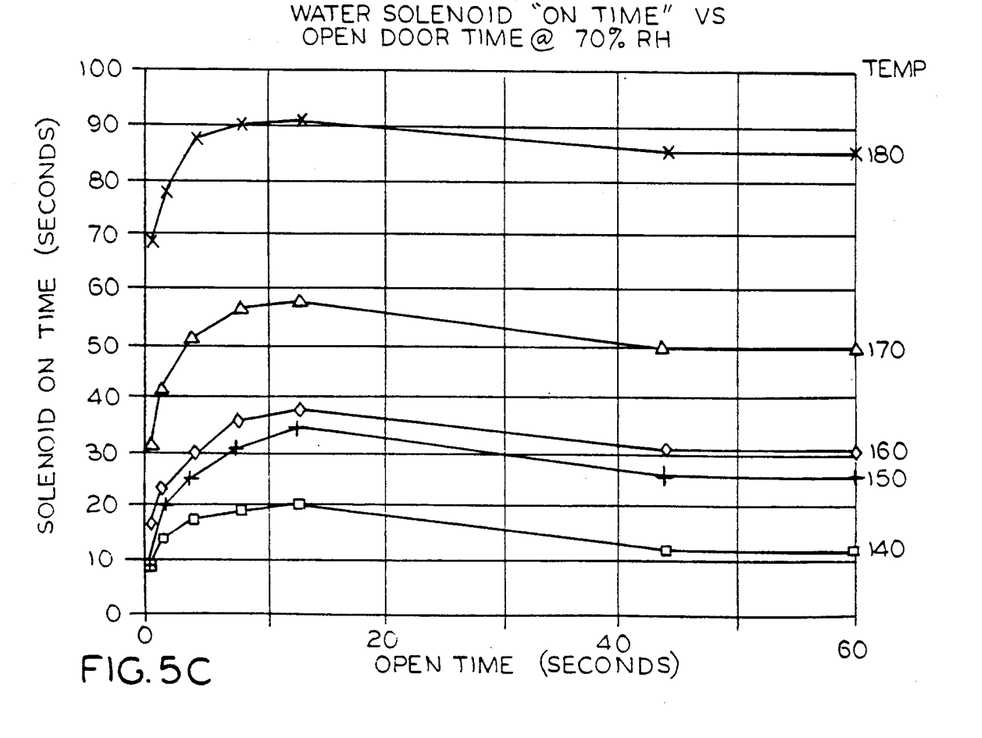
Figure 5D:
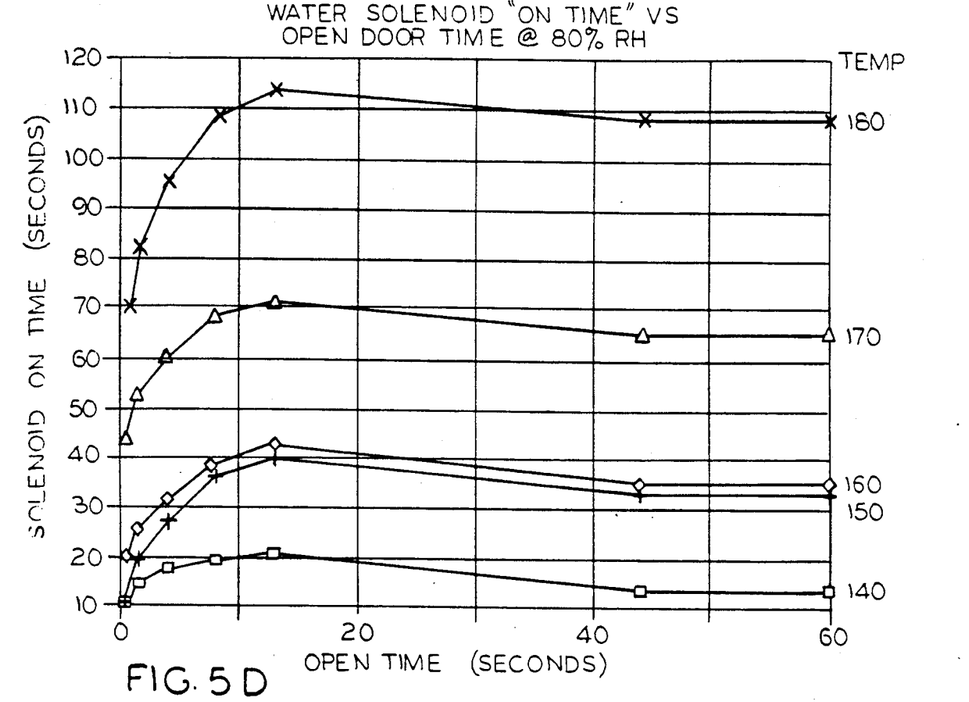
Figure 5E:
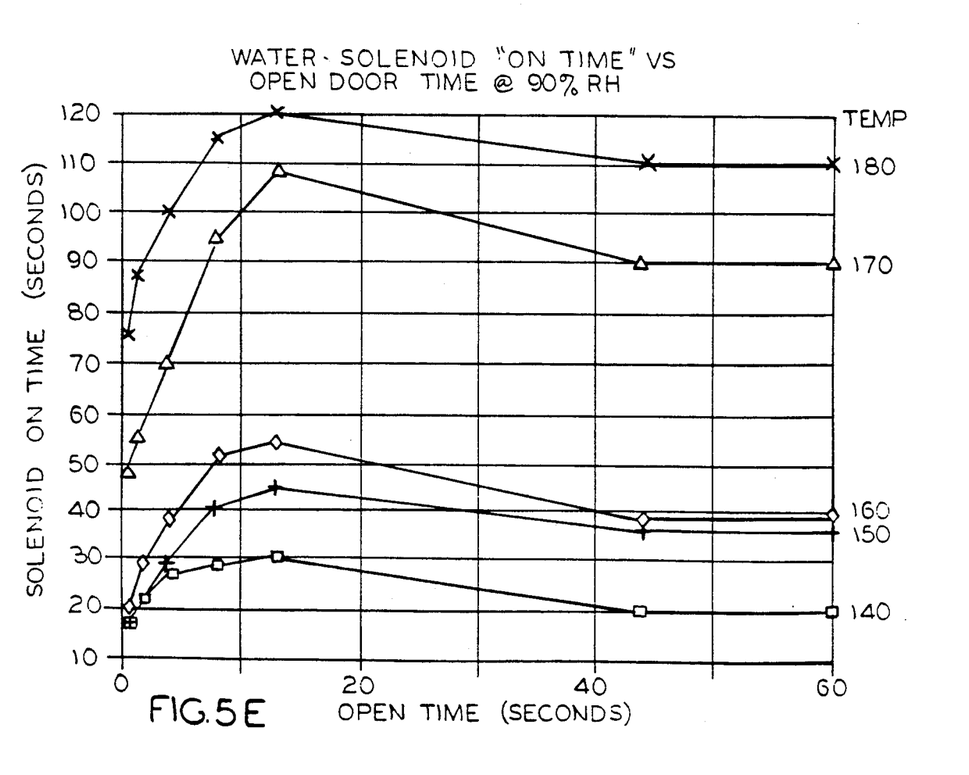

FIG. 4 is a graph of the information contained in a data table in ROM 142, see FIG. 2A, to illustrate the operating curves associated with determining the long closing period time, used at the block 296, see FIG. 3D, at various relative humidity setpoint levels and temperatures. While a number of alternative relative humidity set point targets are possible, only five have been selected (e.g. 50%, 60%, 70%, 80% and 90%).

FIGS. 5A-5E are graphs of information contained data tables in the ROM 142, for determining the water solenoid on time following closure of the doors 110 and 112. Each graph relates to a selected humidity setpoint, and is used to determine the on time as a function of door open time and temperature. This time is used at the block 260, see FIG. 3C, as the variable A.

FIG. 6 is an elevation view of the exemplary embodiment of the dedicated visual display of the cabinet apparatus of the present invention. Information will be displayed either automatically or upon inquiry by the user, including temperature and relative humidity, door open, water being added, and calibration of the cabinet apparatus.

The invention has been described in conjunction with the description of several embodiments. While only particular embodiments of the present invention has been shown and described herein, further modifications may be made without departing from the broader aspects of the invention. These embodiments are meant to be illustrative only and not limiting to any degrees. Other embodiments of the invention will be apparent to those skilled in the art in view of the above disclosure. Accordingly, the appended claims are intended to cover all such changes and alternative constructions that fall within the true scope and spirit of the present invention.

While only particular embodiments of the present invention have been shown and described herein, it will be obvious that further modifications may be made without departing from the invention in its broader aspects. From the foregoing, it will be seen that this invention is one well adapted to retain all of the ends and objects herein above set forth, together with the other advantages which are inherent to the invention. Since many possible embodiments may be made of the invention without departing from the scope thereof, it is understood that all matters herein set forth are shown in the accompanying drawings are to be illustrative and not in a limiting sense. The description of the specific embodiments of the present invention is intended to set forth the best mode known to the inventor for the practice of the invention; consequently, this should be taken as illustrative and not as limiting to any degree. While the preferred embodiment has been described, variations thereto will occur to those skilled in the art within the scope of the present inventive concept which is delineated by the following claims.

We claim:

1. Apparatus for treating and holding food at a predetermined temperature and relative humidity for a finite period of time, comprising in combination:

a cabinet defining an interior storage space for food to be treated, said cabinet having an access opening to permit placement of food items in and removal of food items from said storage space, said cabinet having a door operatively mounted for selective movement between a closed position, wherein said access opening is covered, and an open position, wherein said access opening is uncovered;

means for sensing if said door is in the open position;

means for heating a heater apparatus, said heater apparatus having a heater surface, said heater surface located within said cabinet, said heater surface capable of being selectively heated to a sufficiently high temperature to effectively vaporize water on said heater surface in said storage space;

means for delivering water against said heater surface in a controlled method to provide water vapor in said storage space;

microprocessor control means coupled to said sensing means and said delivering means and including setpoint means for selecting a desired relative humidity level in said interior storage space for causing said delivering means to deliver a preselected metered volume of water to said heater surface according to said desired relative humidity level and the amount of time that said door has been in the open position to compensate for the loss of humidity from said storage space to the atmosphere upon said door being opened; and memory means associated with said microprocessor control means, said memory means containing predetermined parameters relating to time and relative humidity characteristics for said storage space, said memory means providing said parameters to said microprocessor control means upon selective querying of said microprocessor control means.

2. The apparatus according to claim 1 further including temperature sensing means for preventing operation of said heater when said heater surface is above a preselected temperature.

3. The apparatus according to claim 1 wherein a heater element is provided to heat the air in said food storage space.

4. The apparatus according to claim 1 further including temperature sensing means for preventing delivery of water against said heater surface by said water delivery means when said heater surface is below a preselected temperature.

5. The apparatus according to claim 1 wherein said microprocessor control means includes first timer means for determining an elapsed time related to the length of time said door is in the open position, and second timer means for causing said delivering means to deliver water for a preselected time period according to the elapsed time measured by said first timer means.

6. The apparatus according to claim 5 where said first and second timer means preselect said time period according to door open time and desired relative humidity level.

7. The apparatus according to claim 1 further comprising means for inhibiting the delivering of water by said delivering means when said apparatus is first placed in an "on" state.

8. The apparatus according to claim 7 wherein said inhibiting means includes means for inhibiting operation for a preselected minimum period of time.

9. The apparatus according to claim 1 further comprising means responsive to said door being in the closed position for intermittently delivering a metered amount of water at controlled time intervals against said heater surface to produce water vapor in said storage space.

10. Apparatus for treating and holding food at a predetermined temperature and relative humidity for a finite period of time, comprising in combination:
a cabinet defining an interior storage space for food to be treated, said cabinet having an access opening to permit placement of food items in and removal of food items from said storage space, said cabinet having a door operatively mounted for selective movement between a closed position, wherein said access opening is covered, and an open position, wherein said access opening is uncovered;
means for sensing if said door is in the open position;
means for heating a heater apparatus, said heater apparatus having a heater surface, said heater surface located within said cabinet, said heater surface capable of being selectively heated to a sufficiently high temperature to effectively vaporize water on said heater surface in said storage space;
means for delivering water against said heater surface in a controlled method to provide water vapor in said storage space;
microprocessor control means coupled to said sensing means and said delivering means and including setpoint means for selecting a desired relative humidity level in said interior storage space for causing said delivering means to deliver a preselected metered volume of water to said heater surface according to said desired relative humidity level and the amount of time that said door has been in the open position to compensate for the loss of humidity from said storage space to the atmosphere upon said door being opened; and
a read only memory associated with said microprocessor control means, said read only memory containing predetermined parameters relating to time and relative humidity characteristics for said storage space, said read only memory providing said parameters to said microprocessor control means upon selective querying of said microprocessor control means.

11. The apparatus according to claim 10 further including temperature sensing means for preventing operation of said heater when said heater surface is above a preselected temperature.

12. The apparatus according to claim 10 wherein a heater element is provided to heat the air in said food storage space.

13. The apparatus according to claim 10 further including temperature sensing means for preventing delivery of water against said heater surface by said water delivery means when said heater surface is below a preselected temperature.

14. The apparatus according to claim 10 wherein said microprocessor control means includes first timer means for determining an elapsed time related to the length of time said door is in the open position, and second timer means for causing said delivering means to deliver water for a preselected time period according to the elapsed time measured by said first timer means.

15. The apparatus according to claim 14 where said first and second timer means preselect said time period according to door open time and desired relative humidity level.

16. The apparatus according to claim 10 further comprising means for inhibiting the delivering of water by said delivering means when said apparatus is first placed in an "on" state.

17. The apparatus according to claim 16 wherein said inhibiting means includes means for inhibiting operation for a preselected minimum period of time.

18. The apparatus according to claim 10 further comprising means responsive to said door being in the closed position for intermittently delivering a metered amount of water at controlled time intervals against said heater surface to produce water vapor in said storage space.

19. Apparatus for treating and holding food at a predetermined temperature and relative humidity for a finite period of time, comprising in combination:
a cabinet defining an interior storage space for food to be treated, said cabinet having an access opening to permit placement of food items in and removal of food items from said storage space, said cabinet having a door operatively mounted for selective movement between a closed position, wherein said access opening is covered, and an open position, wherein said access opening is uncovered;
means for sensing if said door is in the open position;
means for heating a heater apparatus, said heater apparatus having a heater surface, said heater surface located within said cabinet, said heater surface capable of being selectively heated to a sufficiently high temperature to effectively vaporize water on said heater surface in said storage space;

means for delivering water against said heater surface in a controlled method to provide water vapor in said storage space;

microprocessor control means coupled to said sensing means and said delivering means and including setpoint means for selecting a desired relative humidity level in said interior storage space for causing said delivering means to deliver a preselected metered volume of water to said heater surface according to said desired relative humidity level and the amount of time that said door has been in the open position to compensate for the loss of humidity from said storage space to the atmosphere upon said door being opened;

memory means associated with said microprocessor control means, said memory means containing predetermined parameters relating to time and relative humidity characteristics for said storage space, said memory means providing said parameters to said microprocessor control means upon selective querying of said microprocessor control means; and display means operatively coupled to said microprocessor control means for displaying operating information relating to status of said microprocessor control means.

20. The apparatus according to claim 19 further including temperature sensing means for preventing operation of said heater when said heater surface is above a preselected temperature.

21. The apparatus according to claim 19 wherein a heater element is provided to heat the air in said food storage space.

22. The apparatus according to claim 19 further including temperature sensing means for preventing delivery of water against said heater surface by said water delivery means when said heater surface is below a preselected temperature.

23. The apparatus according to claim 19 wherein said microprocessor control means includes first timer means for determining an elapsed time related to the length of time said door is in the open position, and second timer means for causing said delivering means to deliver water for a preselected time period according to the elapsed time measured by said first timer means.

24. The apparatus according to claim 23 where said first and second timer means preselect said time period according to door open time and desired relative humidity level.

25. The apparatus according to claim 19 further comprising means for inhibiting the delivering of water by said delivering means when said apparatus is first placed in an "on" state.

26. The apparatus according to claim 25 wherein said inhibiting means includes means for inhibiting operation for a preselected minimum period of time.

27. The apparatus according to claim 19 further comprising means responsive to said door being in the closed position for intermittently delivering a metered amount of water at controlled time intervals against said heater surface to produce water vapor in said storage space.

28. Apparatus for treating and holding food at a predetermined temperature and relative humidity for a finite period of time, comprising in combination:

a cabinet defining an interior storage space for food to be treated, said cabinet having an access opening to permit placement of food items in and removal of food items from said storage space, said cabinet having a door operatively mounted for selective movement between a closed position, wherein said access opening is covered, and an open position, wherein said access opening is uncovered;

means for sensing if said door is in the open position;

means for heating a heater apparatus, said heater apparatus having a heater surface, said heater surface located within said cabinet, said heater surface capable of being selectively heated to a sufficiently high temperature to effectively vaporize water on said heater surface in said storage space;

means for delivering water against said heater surface in a controlled method to provide water vapor in said storage space;

microprocessor control means coupled to said sensing means and said delivering means and including setpoint means for selecting a desired relative humidity level in said interior storage space for causing said delivering means to deliver a preselected metered volume of water to said heater surface according to said desired relative humidity level and the amount of time that said door has been in the open position to compensate for the loss of humidity from said storage space to the atmosphere upon said door being opened;

a read only memory associated with said microprocessor control means, said read only memory containing predetermined parameters relating to time and relative humidity characteristics for said storage space, said read only memory providing said parameters to said microprocessor control means upon selective querying of said microprocessor control means; and display means operatively coupled to said microprocessor control means for displaying operating information relating to status of said microprocessor control means.

29. The apparatus according to claim 28 further including temperature sensing means for preventing operation of said heater when said heater surface is above a preselected temperature.

30. The apparatus according to claim 28 wherein a heater element is provided to heat the air said food storage space.

31. The apparatus according to claim 28 further including temperature sensing means for preventing delivery of water against said heater surface by said water delivery means when said heater surface is below a preselected temperature.

32. The apparatus according to claim 28 wherein said microprocessor control means includes first timer means for determining an elapsed time related to the length of time said door is in the open position, and second timer means for causing said delivering means to deliver water for a preselected time period according to the elapsed time measured by said first timer means.

33. The apparatus according to claim 32 where said first and second clock and timer means preselect said time period according to door open time and desired relative humidity level.

34. The apparatus according to claim 28 further comprising means for inhibiting the delivering of water by said delivering means when said apparatus is first placed in an "on" state.

35. The apparatus according to claim 24 wherein said inhibiting means includes means for inhibiting operation for a preselected minimum period of time.

36. The apparatus according to claim 28 further comprising means responsive to said door being in the closed position for intermittently delivering a metered amount of water at controlled time intervals against said heater surface to produce water vapor in said storage space.

37. A method of controlling the temperature and relative humidity of a storage space within a cabinet apparatus used for treating and holding prepared food, comprising the steps of:

initializing power to said apparatus;

performing a preheat cycle for a select time interval to raise the temperature of said storage space to a predetermined temperature parameter;

performing a prehumidity cycle for a select time interval to raise the relative humidity of said storage space to a predetermined relative humidity parameter;

monitoring the status of the door to the cabinet apparatus with respect to an open and a closed position and when in the open position then monitoring with respect to the length of time the door to the cabinet has remained in the open position;

performing a normal operating cycle to adjust the temperature and relative humidity of said storage space to predetermined levels depending on the length of time the door to the cabinet has been in an open position, said normal operating cycle further comprising the steps of sensing if said door is in the open position, heating a heater apparatus to a predetermined temperature level, delivering water against a portion of said heater apparatus in a controlled manner for a time determined by length of time said door is in the open position and a selectable relative humidity setpoint, and converting said sensing means to digital control signals;

displaying the results of the above steps, upon inquiry, in a visual display integral to said cabinet apparatus; and controlling said normal operating cycle, said preheat cycle and said prehumidity cycle with respect to cycle duration when said relative humidity and said temperature of said storage space of said cabinet apparatus exceed specified predetermined parameters contained within an associated memory means through the operation of a general purpose microprocessor.

* * * * *